(12) United States Patent
Lai (10) Patent No.: US 9,031,322 B2
(45) Date of Patent: May 12, 2015

(54) NOISE ESTIMATION APPARATUS AND METHOD THEREOF

(71) Applicant: Novatek Microelectronics Corp., Hsinchu (TW)

(72) Inventor: Kuan-Kang Lai, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 131 days.

(21) Appl. No.: 13/897,001

(22) Filed: May 17, 2013

(65) Prior Publication Data

US 2014/0193070 A1    Jul. 10, 2014

(30) Foreign Application Priority Data

Jan. 8, 2013  (TW) .............. 102100585 A (51) Int. Cl.
*G06K 9/00* (2006.01)
*G06T 7/00* (2006.01)

(52) U.S. Cl.
CPC ..... *G06T 7/0002* (2013.01); *G06T 2207/10016* (2013.01); *G06T 2207/20021* (2013.01); *G06T 2207/20076* (2013.01); *G06T 2207/30168* (2013.01)

(58) Field of Classification Search
CPC ........... G06K 9/40; H04N 5/21; H04N 17/00; H04N 17/004; G06T 5/002; G06T 5/003; G06T 5/20; G06T 5/40; G06T 2207/10016; G06T 2207/20008; G06T 2207/20182; G06T 2207/20216; G06T 2207/20224

See application file for complete search history.

(56) References Cited

U.S. PATENT DOCUMENTS

| | | | |
|---|---|---|---|
| 5,657,401 A | 8/1997 | De Haan et al. | |
| 7,046,307 B1 | 5/2006 | Hui | |
| 7,092,579 B2 | 8/2006 | Serrano et al. | |
| 7,714,939 B2 | 5/2010 | Zhou et al. | |
| 7,715,645 B2 | 5/2010 | Zhou et al. | |
| 8,279,345 B2 * | 10/2012 | Rossignol et al. | 348/620 |
| 2005/0107982 A1 | 5/2005 | Sun et al. | |
| 2006/0103765 A1 | 5/2006 | Zhou et al. | |

* cited by examiner

*Primary Examiner* — Jose Couso
(74) *Attorney, Agent, or Firm* — Rabin & Berdo, P.C.

(57) ABSTRACT

A noise estimation apparatus for calculating a noise estimation value of a frame of an image is provided. The noise estimation apparatus includes a distribution calculation unit, a variance calculation unit, a distribution curve generation module and a noise estimation unit. The distribution calculation unit generates a pixel distribution according to multiple pixel data of an $i^{th}$ block of the frame and multiple previous pixel data of the $i^{th}$ block of a previous frame. The variance calculation unit combines the pixel data and the previous pixel data to generate a variance value. The curve distribution generation module generates a curve distribution according to the variance value, and compares the pixel distribution with the curve distribution to generate a weighting value. The noise estimation unit outputs the noise estimation value according to the weighting value and the variance value corresponding to each of the blocks of the frame.

20 Claims, 8 Drawing Sheets

NOISE ESTIMATION APPARATUS AND METHOD THEREOF

This application claims the benefit of Taiwan application Serial No. 102100585, filed Jan. 8, 2013, the subject matter of which is incorporated herein by reference.

BACKGROUND OF THE INVENTION

1. Field of the Invention

The invention relates in general to a noise estimation apparatus and a method thereof, and more particularly to a noise estimation apparatus for calculating a noise in an image frame and a method thereof.

2. Description of the Related Art

As multimedia applications progress at a fast pace in the recent years, requirements on image quality are also continuously raised. Multimedia images are often interfered by noises, which degrade the image quality by not only reducing clearness and sharpness but also blurring object outlines of the image. To eliminate image noises, a noise estimation technique is generally implemented in an image processing system to serve as a basis for noise reduction.

However, during the process of noise estimation, details or dynamic image contents in the image are frequently misjudged as noises in the image. Thus, the image processed by noise reduction may quite the contrary given a degraded image quality if noise reduction is performed based on the above misjudgment.

Therefore, there is a need for a noise estimation technique that effectively determines a noise level of image contents to prevent details or dynamic image contents from being misjudged as noises.

SUMMARY OF THE INVENTION

The invention is directed to a noise estimation technique for effectively determining a noise level of image contents.

According to an aspect of the present invention, a noise estimation apparatus for calculating a noise estimation value of a frame of an image is provided. The frame has an M number of overlapping or non-overlapping blocks, where M is a positive integer greater than 1. Each of the blocks has a plurality of pixel data including a target pixel data. The noise estimation apparatus includes a distribution calculation unit, a variance calculation unit, a distribution curve generation module and a noise estimation unit. According to the plurality of pixel data of an $i^{th}$ block of the frame and a plurality of previous pixel data of the $i^{th}$ block of a previous frame, the distribution calculation unit calculates pixel numbers respectively corresponding to a plurality of pixel values to generate a pixel distribution, where i is a positive integer between 1 and M. The variance calculation unit combines the pixel data of the $i^{th}$ block of the frame and the previous pixel data of the $i^{th}$ block of the previous frame, and correspondingly generates a variance value. The distribution curve generation module generates a distribution curve according to the variance value by regarding the target pixel data of the $i^{th}$ block of the frame as a basis, and compares the pixel distribution with the distribution curve to correspondingly generate a weighting value. The noise estimation unit outputs the noise estimation value according to the weighting value and the variance value corresponding to each of the blocks of the frame.

According to another aspect of the present invention, a noise estimation method applied to a noise estimation apparatus is provided. The noise estimation method is for calculating a noise estimation value of a frame of an image. The frame has an M number of overlapping or non-overlapping blocks, where M is a positive integer greater than 1. Each of the blocks has a plurality of pixel data including a target pixel data. The noise estimation method includes steps of: calculating pixel numbers respectively corresponding to a plurality of pixel values according to the plurality of pixel data of an $i^{th}$ block of the frame and a plurality of previous pixel data of the $i^{th}$ block of a previous frame to generate a pixel distribution, where i is a positive integer between 1 and M; combining the pixel data of the $i^{th}$ block of the frame and the previous pixel data of the $i^{th}$ block of the previous frame, and correspondingly generating a variance value; generating a distribution curve according to the variance value by regarding the target pixel data of the $i^{th}$ block of the frame as a basis, and comparing the pixel distribution with the distribution curve to correspondingly generate a weighting value; and outputting the noise estimation value according to the weighting value and the variance value corresponding to each of the blocks of the frame.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
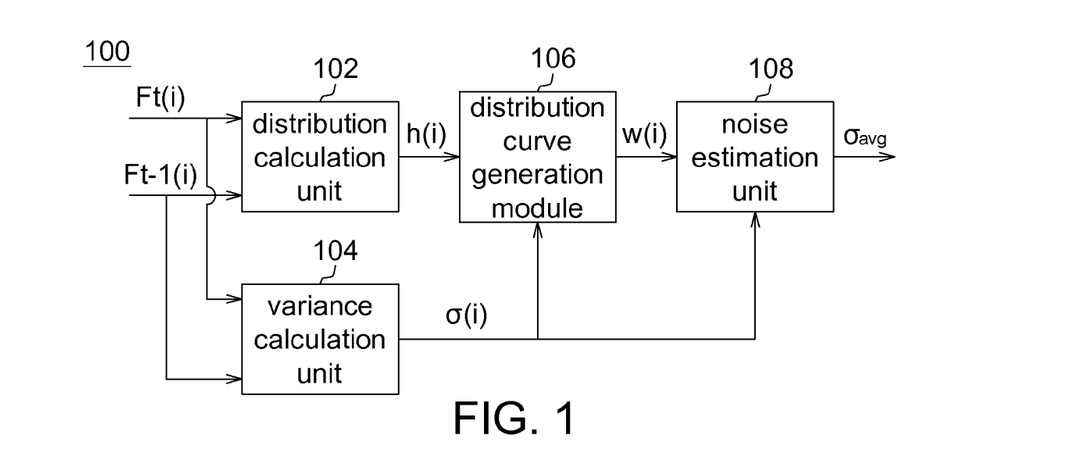
FIG. 1 is a block diagram of a noise estimation apparatus according to an embodiment of the present invention.

FIG. 1 shows a block diagram of a noise estimation apparatus 100 according to an embodiment of the present invention. The noise estimation apparatus 100 is for calculating a noise estimation value $\sigma_{avg}$ of a frame of an image. The frame has an M number of overlapping or non-overlapping blocks, where M is a positive integer greater than 1. Each of the blocks has multiple pixel data including a target pixel data. For example, the multiple pixel data correspond to multiple pixel points of a display panel.

Figure 2A:
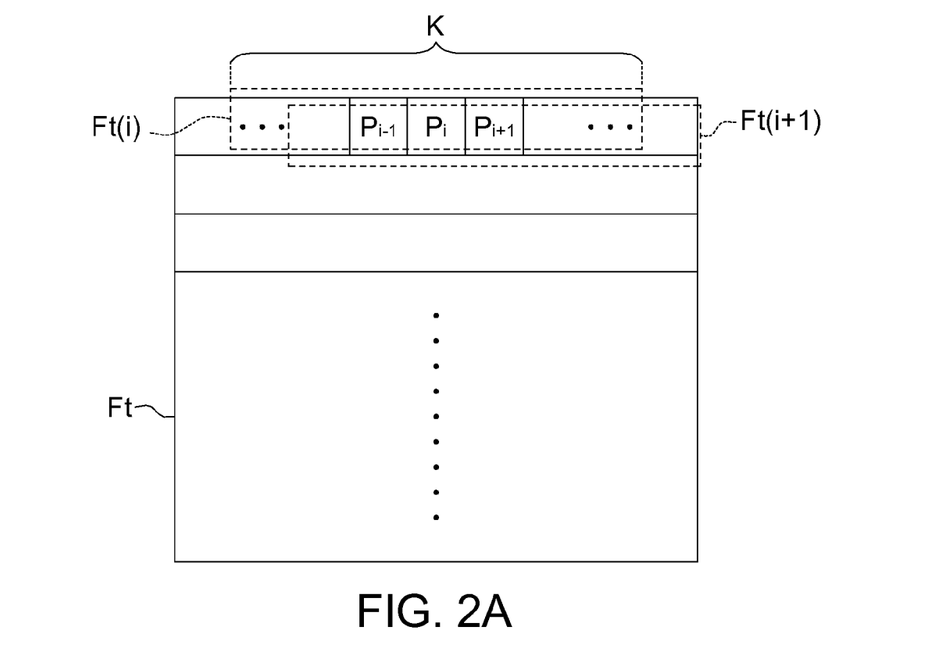
FIG. 2A is a schematic diagram of an M number of overlapping blocks of a frame.
Figure 2B:
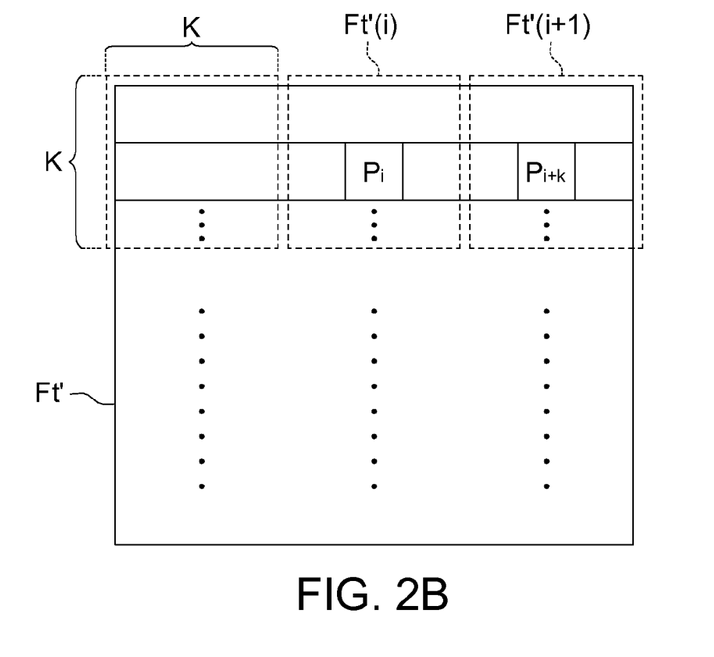
FIG. 2B is a schematic diagram of an M number of non-overlapping blocks of a frame.

For better illustrations, descriptions are given with reference to FIGS. 2A and 2B below. FIGS. 2A and 2B are respectively schematic diagrams of an M number of overlapping blocks and an M number of non-overlapping blocks of a frame. In FIG. 2A, each horizontal row of a frame Ft represents a pixel row, and each square grid in the rows represents one pixel. Each pixel corresponds to one block, and the target pixel data is a central pixel data of the corresponding block. Further, assume that a size of the blocks in the frame is a 1×K pixel row, where K is an odd number greater than zero. When the target pixel data is an $i^{th}$ pixel data $P_i$ in the frame, an $i^{th}$ block Ft(i) corresponding to the pixel data $P_i$ includes pixel data $P_{i-(K-1)/2}$, $P_{i-(K-1)/2+1}$, ..., Pi, ..., $P_{i+(K-1)/2-1}$ and $P_{i+(K-1)/2}$ in the frame. When the target pixel data is an $(i+1)^{th}$ pixel data $P_{i+1}$ in the frame, an $(i+1)^{th}$ block Ft(i+1) corresponding to the pixel data $P_{i+1}$ includes pixel data $P_{i+1-(K-1)/2}$, $P_{i+1-(K-1)/2+1}$, ..., $P_{i+1}$, ..., $P_{i+1+(K-1)/2-1}$, and $P_{i+1+(K-1)/2}$ in the frame, and so forth. In contrast, in FIG. 2B, for example, the size of each of the blocks in the frame is a K×K pixel matrix, and a frame Ft' is evenly divided into multiple non-overlapping blocks, with the target pixel data of each block being the central pixel data of the block. For example, the target pixel data of a block Ft'(i) is the pixel data $P_i$, and the target pixel data of a block Ft'(i+1) is the pixel data $P_{i+K}$. The present invention is not limited to the above examples; the size of the blocks and the position of the target pixel data in the corresponding block are adjustable according to different applications.

Again referring to FIG. 1, the noise estimation apparatus 100 includes a distribution calculation unit 102, a variance calculation unit 104, a distribution curve generation module 106 and a noise estimation unit 108. According to multiple pixel data of the $i^{th}$ block Ft(i) of the frame Ft and multiple previous pixel data of the $i^{th}$ block Ft−1(i) of a previous frame Ft−1, the distribution calculation unit 102 calculates pixel numbers respectively corresponding to multiple pixel values to generate a pixel distribution h(i), where i is a positive integer between 1 and M. For example, the $i^{th}$ block Ft(i) of the frame Ft and the $i^{th}$ block Ft−1(i) of the previous frame Ft−1 correspond to the same display position in the image, and the previous frame Ft−1 is a frame earlier than the frame Ft in the time domain. Further, for example, the pixel value is a grayscale level.

The variance calculation unit 104 combines the multiple pixel data of the $i^{th}$ block Ft(i) of the frame Ft with the multiple previous pixel data of the $i^{th}$ block Ft−1(i) of the previous frame Ft−1, and correspondingly generates a variance value $\sigma(i)$. For example, the variance value $\sigma(i)$ represents a variance in statistics.

The distribution curve generation module 106, by regarding the target pixel data of the $i^{th}$ block Ft(i) of the frame Ft as a basis, generates a distribution curve G(i) according to the variance value $\sigma(i)$, and compares the pixel distribution h(i) with the distribution curve G(i) to correspondingly generate a weighting value W(i).

Next, the noise estimation unit 108 outputs the noise estimation value $\sigma_{avg}$ according to the weighting values W(1) to W(M) and variance values $\sigma(1)$ to $\sigma(M)$ respectively corresponding to the blocks Ft(1) to Ft(M) of the frame Ft.

Figure 3:
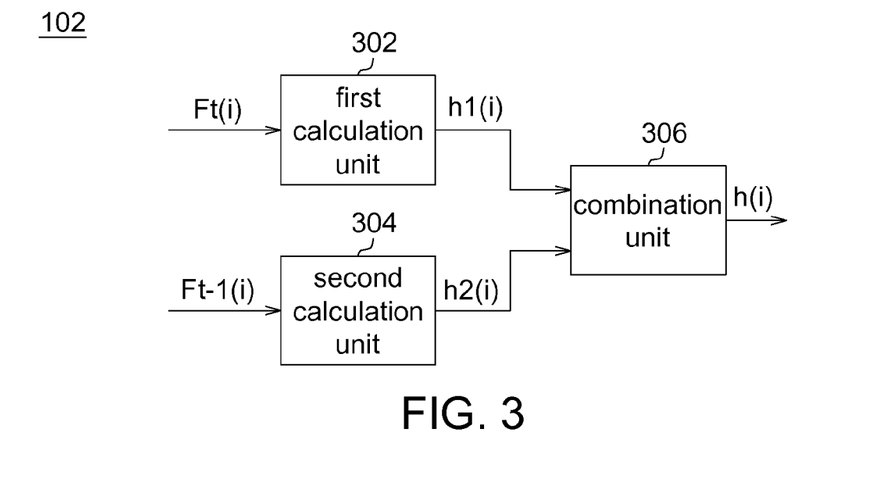
FIG. 3 is a block diagram of an example of a distribution calculation unit.

FIG. 3 shows a block diagram of an example of the distribution calculation unit 102. The distribution calculation unit 102 includes a first calculation unit 302, a second calculation unit 304 and a combination unit 306. The first calculation unit 302 calculates the pixel numbers of the multiple pixel data of the $i^{th}$ block of the frame Ft corresponding to the pixel values to output a first distribution h1(i). The second calculation unit 304 calculates the pixel numbers of the multiple previous pixel data of the $i^{th}$ block of the previous frame Ft−1 corresponding to the pixel values to output a second distribution h2(i). The combination unit 306 combines the first distribution h1(i) and the second distribution h2(i) to generate the pixel distribution h(i). For example, the first distribution h1(i) and the second distribution h2(i) are in form of a histogram.

Figure 4A:
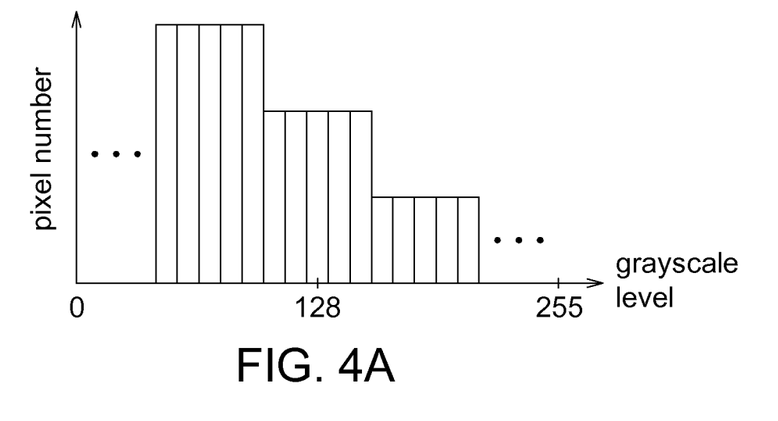
FIG. 4A is a schematic diagram of an example of a first distribution.
Figure 4B:
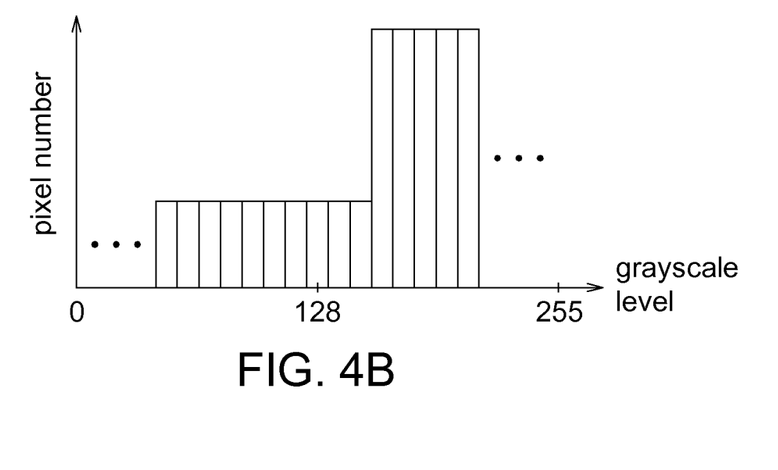
FIG. 4B is a schematic diagram of an example of a second distribution.

FIG. 4A shows a schematic diagram of an example of the first distribution h1(i); FIG. 4B shows a schematic diagram of an example of the second distribution h2(i). Referring to FIGS. 4A and 4B, the horizontal axis in the coordinates represents a grayscale level, ranging from 0 to 255, for example, and the vertical axis represents a pixel number. Each bar represents a pixel number corresponding to a grayscale level.

Figure 4C:
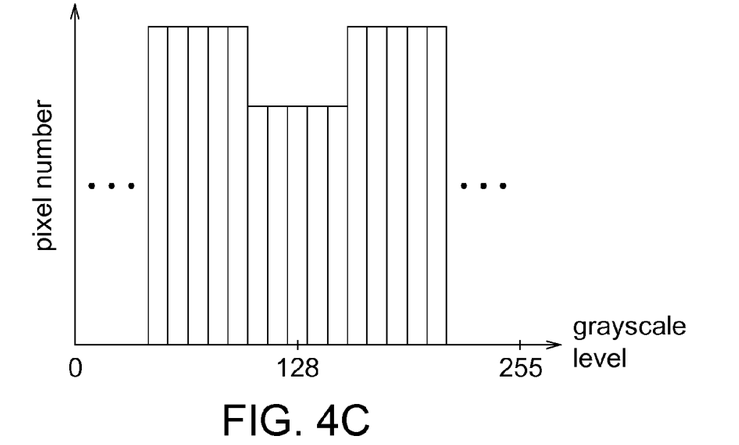
FIG. 4C is a schematic diagram of an example of a pixel distribution.

The combination unit 306 may combine the first distribution h1(i) with the second distribution h2(i) by superposition. For example, the pixel numbers in the first distribution h1(i) corresponding to the pixel values are respectively added to the pixel numbers in the second distribution h2(i) corresponding to the pixel values to generate the pixel distribution h(i) of the pixel numbers corresponding to different pixel values. FIG. 4C shows a schematic diagram of an example of the pixel distribution h(i) after superposing the first distribution h1(i) in FIG. 4A and the second distribution h2(i) in FIG. 4B.

Instead of the example above, in an alternative embodiment, the distribution calculation unit 102 may also process the multiple pixel data of the $i^{th}$ block of the frames Ft to Ft-k corresponding to different time points to correspondingly generate a pixel distribution h'(i), where k is a positive integer. By introducing multiple frames Ft to Ft-k corresponding to different time points, a greater number of sampling points for image processing can be provided.

Figure 5:
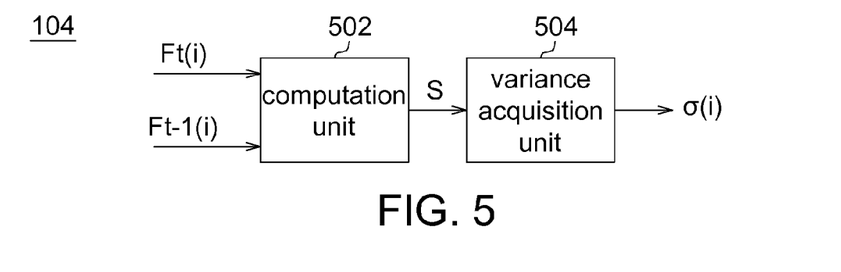
FIG. 5 is a block diagram of an example of a variance calculation unit.

FIG. 5 shows a block diagram of an example of the variance calculation unit 104. The variance calculation unit 104 includes a computation unit 502 and a variance acquisition unit 504. The computation unit 502 combines the multiple pixel data of the $i^{th}$ block of the frame Ft with the multiple previous pixel data of the $i^{th}$ block of the previous frame Ft-1 to correspondingly output a synthesis pixel data S(i).

Figure 6:
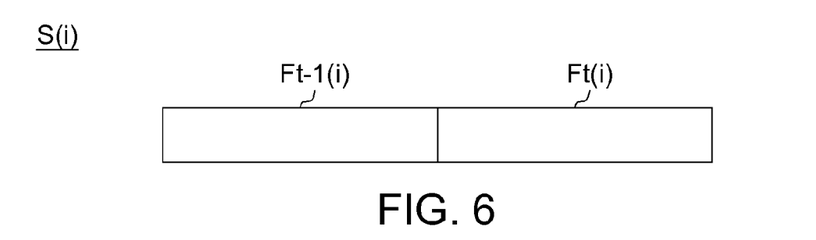
FIG. 6 is a schematic diagram of an example of a synthesis pixel data.

FIG. 6 shows an example of the synthesis pixel data S(i). In FIG. 6, multiple previous pixel data Ft−1(i) of the $i^{th}$ blocks of the frame Ft-1 are followed by multiple pixel data Ft(i) of the $i^{th}$ blocks of the frame Ft to form a synthesis pixel data S(i). It should be noted that the above example is not to be construed as a limitation to the present invention. In an alternative embodiment, the computation unit 502 may generate the synthesis pixel data S(i) including the multiple pixel data Ft(i) of the $i^{th}$ blocks of the frame Ft and the multiple previous pixel data Ft−1(i) of the $i^{th}$ blocks of the frame Ft−1 through other combination and arrangement methods.

Again referring to FIG. 5, the variance acquisition unit 504 generates the variance value $\sigma(i)$ according to the synthesis pixel data S(i). For example, the variance value $\sigma(i)$ can be generated by utilizing common image processing software, and details thereof shall be omitted herein. Assuming that the distribution calculation unit 102 processes the multiple pixel data of the $i^{th}$ blocks of the frames Ft to Ft-k corresponding to different time points to correspondingly generate the pixel distribution h'(i), the variance calculation unit 104 correspondingly calculates the multiple pixel data of the $i^{th}$ blocks of the frames Ft to Ft-k corresponding to different time points to generate the variance value σ(i). In short, instead of performing the noise estimation according to the frame Ft and the previous frame Ft, the noise estimation of the present invention may also be performed according to multiple frames Ft to Ft-k respectively corresponding to different time points in an alternative embodiment.

Figure 7:
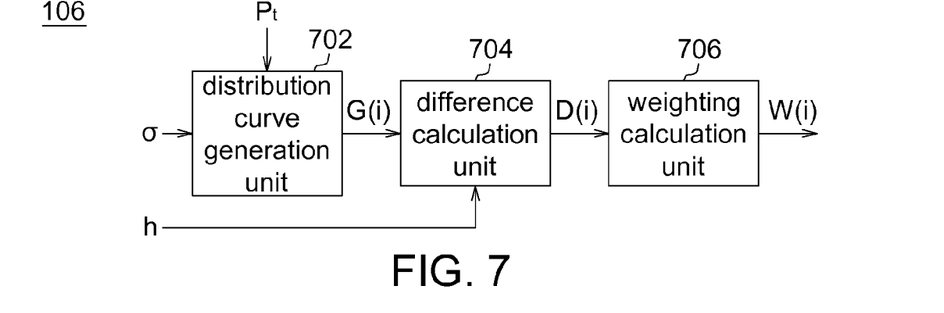
FIG. 7 is a block diagram of an example of a distribution curve generation module.

FIG. 7 shows a block diagram of an example of the distribution curve generation module 106. The distribution curve generation module 106 includes a distribution curve generation unit 702, a difference calculation unit 704 and a weighting calculation unit 706. The distribution curve generation unit 702, by regarding the target pixel data of the $i^{th}$ block of the frame Ft as a basis, looks up a look-up table (LUT) to output the distribution curve G(i) according to the variance value σ(i).

For example, the distribution curve G(i) is a Gaussian distribution. A main reason for choosing the Gaussian distribution as an example is that, during researches on common television image signals, the Applicant discovers that pixel data interfered by noises frequently display a Gaussian distribution. In contrast, details or image contents or pixel distributions corresponding to dynamic image contents are usually very different from the Gaussian distribution. Therefore, when it is concluded after comparison that the pixel distribution in the image contents are similar to the Gaussian distribution, it implies that the image contents are likely noise interfered. The details above serve as an example for explaining the present invention rather than limiting the present invention thereto. In an alternative embodiment, the distribution curve G(i) may be a Poisson distribution. All in all, distribution curves that correspond to a noise model of image signals are encompassed within the spirit of the present invention.

In an example of a Gaussian distribution as the distribution curve distribution G(i), because the Gaussian distribution features a characteristic of having a constant area covered below the distribution curve, a plurality of sets of Gaussian distribution models respectively corresponding to different variance values σ(i) can be pre-established in the distribution curve generation unit 702 to be later employed in an LUT step.

Figure 8:
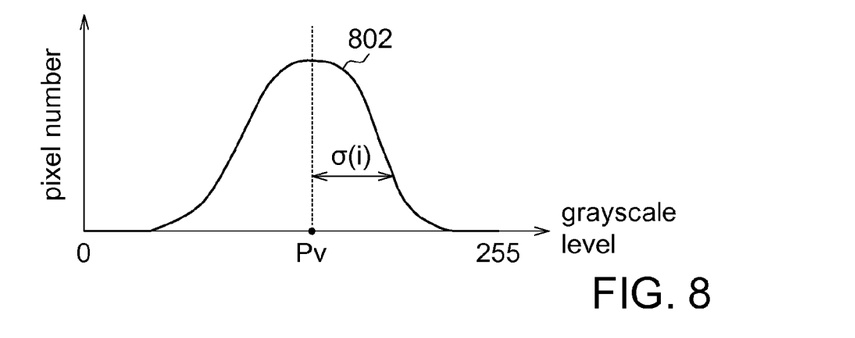
FIG. 8 is a schematic diagram of an example of a distribution curve.

FIG. 8 shows a schematic diagram of an example of the distribution curve G(i). In FIG. 8, the horizontal axis of the coordinates represents a pixel value, e.g., a grayscale level ranging from 0 to 255, and the vertical axis represents a pixel number. A curve 802 represents the curve distribution G(i) obtained from an LUT according to the variance value σ(i) by regarding a pixel value Pv corresponding to a target pixel data as a basis. In the distribution curve generation unit 702, since a coordinate origin (e.g., a mean value of 0) is regarded as a basis in pre-established distribution models (e.g., Gaussian distribution models), the distribution curve generation module 106 further sets the pixel value Pv corresponding to the target pixel data as a basis for outputting the distribution curve G(i) in order to present a noise model regarding the target pixel data as a basis.

Again referring to FIG. 7, the difference calculation unit 704 compares the distribution curve G(i) with the pixel distribution h(i) to output a difference D(i). For example, the difference D(i) is obtained by the equation below:

$$D(i) = \sum_k |S_k|$$

In the above equation, the parameter k represents the pixel value, and ranges between 0 and 255 if the pixel value represents a grayscale level, and the parameter $S_k$ represents a pixel number of subtracting the pixel number of the pixel distribution h(i) at the pixel value k from the pixel number of the distribution curve G(i) at the pixel value k. It should be noted that the above details associated with the difference D(i) are not to be construed as limitations to the present invention. In other embodiments, the difference D(i) may also be generated from linear or non-linear combinations based on the parameter $S_k$, or from quantization on the difference between distribution curve G(i) and the pixel distribution h(i).

Figure 9A:
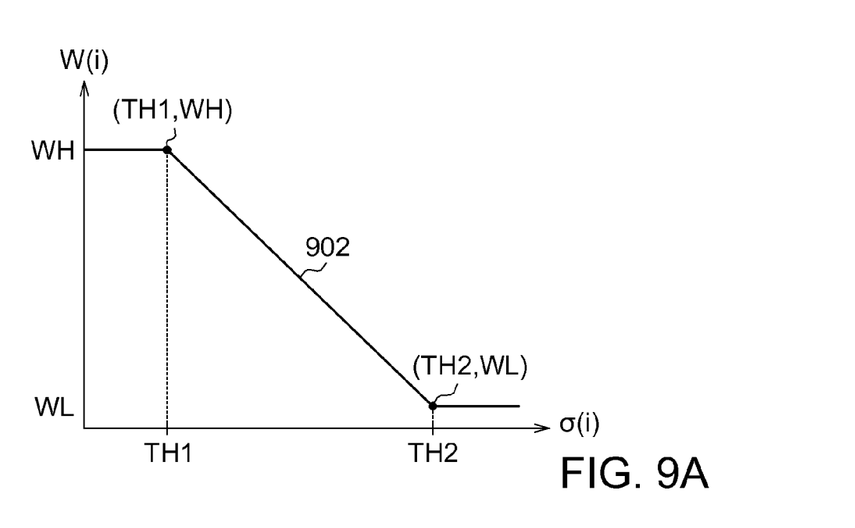
FIG. 9A is a schematic diagram of an example of a corresponding relationship between a weighting value and a variance value.

The weighting calculation unit 706 correspondingly generates a weighting value W(i) according to the difference D(i). FIG. 9A shows a schematic diagram of an example of a corresponding relationship between the weighting value W(i) and the difference D(i). As observed from changes in a curve 902, when the difference value D(i) is between a first threshold TH1 and a second threshold TH2, with the second threshold TH2 being greater than the first threshold TH1, the corresponding weighting value W(i) becomes smaller as the difference D(i) gets larger. In one embodiment, the weighting value W(i) is between an upper weighting limit WH and a lower weighting limit WL. In the curve 902, the difference D(i) between the first threshold TH1 and the second threshold TH2 is obtained by linearly interpolating coordinates (TH1, WH) and (TH2, WL). For example, the upper weighting limit WH and the lower weighting limit WL are values between 0 and 1, with the upper weighting limit WH being greater than the lower weighting limit WL. A significance of the curve 902 is to indicate a possibility that the weighting value W(i) corresponds to noises. As the difference D(i) gets larger, the difference between the pixel distribution h(i) and the distribution curve G(i) becomes greater, indicating that the pixel distribution h(i) is less similar to the distribution curve (e.g., a Gaussian curve) of noises. That is to say, the possibility of noises gets lower as the difference D(i) gets larger, and so the weighting value W(i) is correspondingly smaller. However, the present invention is not limited to the above example. That is, given that the weighting value W(i) reflects the weighting of noises according to the difference D(i), instead of limiting the corresponding relationship curve between the weighting value W(i) and the difference D(i) to linear interpolation between two points, modifications made to the above method for obtaining the difference D(i) are all encompassed within the scope of the present invention.

Figure 9B:
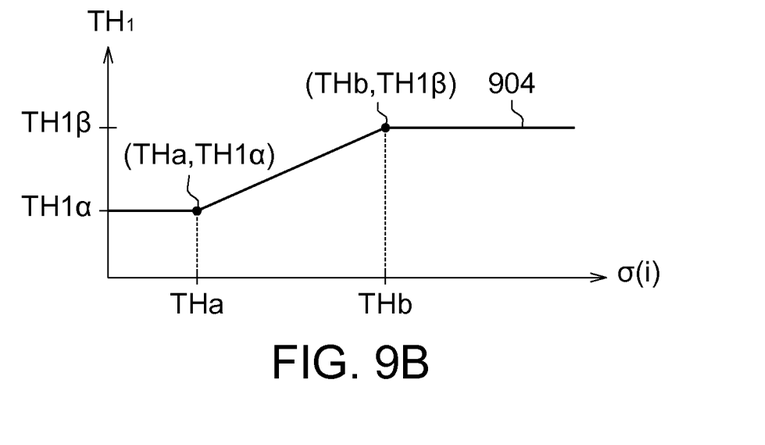
FIG. 9B is a schematic diagram of an example of a corresponding relationship between a first threshold and a variance value.
Figure 9C:
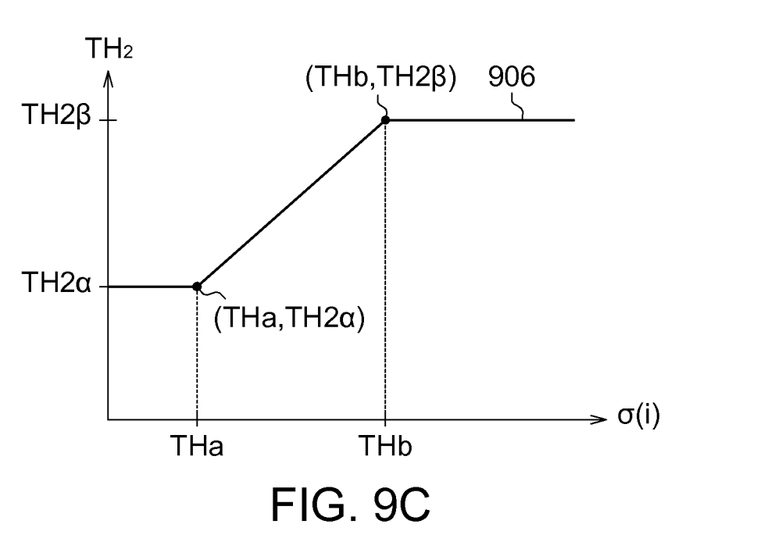
FIG. 9C is a schematic diagram of an example of a corresponding relationship between a second threshold and a variance value.

The first threshold TH1 and the second threshold TH2 may be, for example, generated according to the variance value σ(i) by means of dynamic thresholds. Detailed descriptions associated with the first threshold TH1 and the second threshold TH2 are given below with reference to FIGS. 9B and 9C, which are respectively schematic diagrams of a corresponding relationship between the first threshold TH1 and the variance value σ(i) and between the second threshold TH2 and the variance value σ(i). In FIG. 9B, as observed from changes in a curve 904, when the variance value σ(i) changes between a lower threshold THa and an upper threshold THb, the first threshold TH1 is between a first lower threshold TH1α and a first upper threshold TH1β, and a value of the first threshold TH1 can be obtained by linearly interpolating points (THa, TH1α) and (THb, TH1β). Similarly, in FIG. 9, as observed from changes in a curve 906, when the variance value σ(i)

changes between the lower threshold THa and the upper threshold THb, the second threshold TH2 is between a second lower threshold TH2α and a second upper threshold TH2β, and a value of the second threshold TH2 can be obtained by linearly interpolating points (THa, TH2α) and (THb, TH2β). The first lower threshold TH1α, the first upper threshold TH1β, the second lower threshold TH2α, the second upper threshold TH2β, the upper threshold THb and the lower threshold THa may be configured according to different applications. However, the second lower threshold TH2α and the second upper threshold TH2β are required to be greater than the first lower threshold TH1α and the first upper threshold TH1β. By generating the first threshold TH1 and the second threshold TH2 through means of dynamic thresholds, even when the variance value σ(i) is too large, the weighting calculation unit 706 is nevertheless capable of effectively determining the noise level of the image contents according to the appropriate weighting value W(i) corresponding to the difference D(i).

Figure 10:
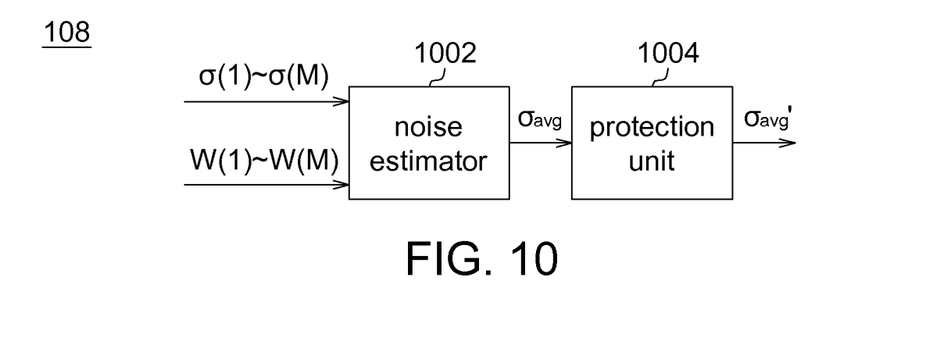
FIG. 10 is a block diagram of an example of a noise estimation unit.

FIG. 10 shows a block diagram of an example of the noise estimation unit 108. The noise estimation unit 108 includes a noise estimator 1002. The noise estimator 1002 performs a weighted averaging process according to the weighting values W(1) to W(M) and the variance values σ(1) to σ(M) respectively corresponding to the blocks Ft(1) to Ft(M) of the frame Ft to output the noise estimation value $\sigma_{avg}$. For example, the noise estimation value $\sigma_{avg}$ is obtained by the equation below:

$$\sigma_{avg} = \frac{\sum_i \sigma(i) \cdot W(i)}{\sum_i W(i)}$$

It is known from the above equation that, the noise estimation value $\sigma_{avg}$ represents the noise level of the entire frame Ft. The noise level of the frame Ft becomes higher as the noise estimation value $\sigma_{avg}$ gets larger, or else becomes lower as the noise estimation value $\sigma_{avg}$ gets smaller. It should be noted that the present invention is not limited to the above reference for determining noises in a frame. In an alternative embodiment, results obtained from calculation combinations according to the weighting value W(i) and the variance value σ(i) may also serve as a reference value for evaluating noises in a frame.

The noise estimation unit 108 may further include a protection unit 1004. When a sum of the weighting values W(1) to W(M) of all of the blocks Ft(1) to Ft(M) (i.e., $$\sum_i W(i))$$

is lower than a threshold T, the protection unit 1004 divides the noise estimation value σ(i) outputted by the noise estimator 1002 by a denominator DN, and outputs a corresponding quotient as the noise estimation value σ(i). When the sum of the weighting values W(1) to W(M) of all of the blocks Ft(1) to Ft(M) is too low, the corresponding noise estimation value σ(i) obtained is considered unreliable. Thus, the protection unit 1004 divides the noise estimation value σ(i) by the denominator DN to appropriately adjust the noise estimation value σ(i), and outputs the adjusted noise estimation value σ(i).

Figure 11:
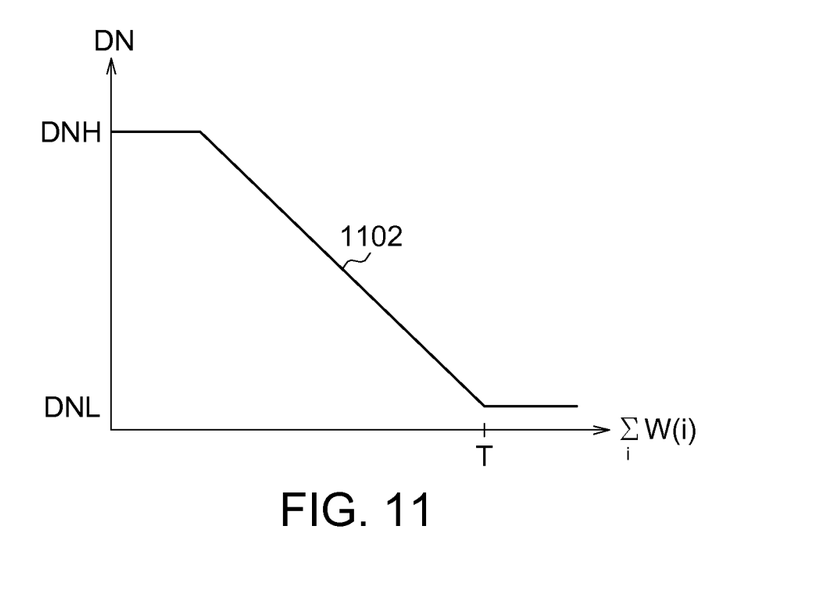
FIG. 11 is a schematic diagram of an example of a corresponding relationship between a sum of weighting values of all the blocks and a denominator.

FIG. 11 shows a schematic diagram of an example of a corresponding relationship between the sum of the weighting values W(1) to W(M) of all of the blocks Ft(1) to Ft(M) and the denominator DN. As seen from a curve 1102, as the sum of the weighting values W(1) to W(M) of all of the blocks Ft(1) to Ft(M) becomes further lower than the threshold T, the denominator DN gets larger. For example, the denominator DN ranges between an upper denominator limit DNH and a lower denominator limit DNL. For example, a value of the upper denominator limit DNL is 128, and a value of the lower denominator limit DNL is 1.

Figure 12:
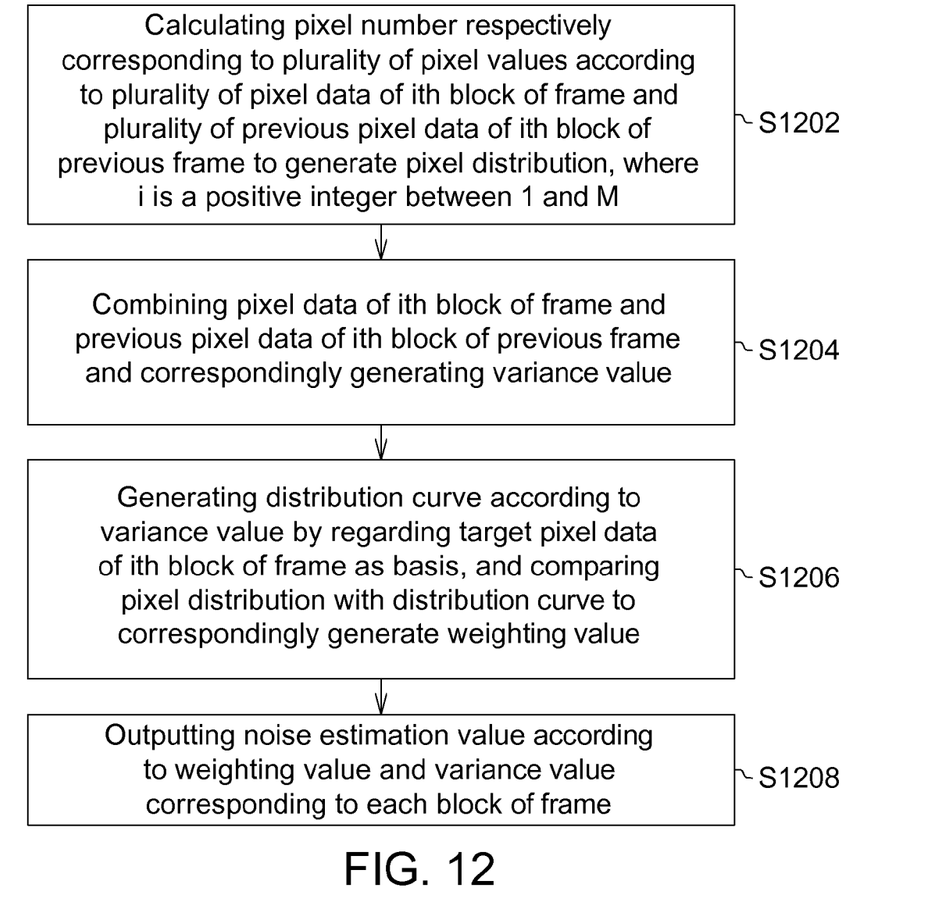
FIG. 12 is a flowchart of a noise estimation method according to an embodiment.

A noise estimation method is further provided according to an embodiment of the present invention. The noise estimation method, applicable to the noise estimation apparatus 100 according to foregoing embodiments, includes steps S1202, S1204, S1206 and S1208. In step S1202, according to multiple pixel data of an $i^{th}$ block of a frame Ft and multiple previous pixel data of the $i^{th}$ block of a previous frame Ft−1, pixel numbers respectively corresponding to multiple pixel values are calculated to generate a pixel distribution h(i), where i is a positive integer between 1 and M.

In step S1204, the plurality of pixel data of the $i^{th}$ block of the frame Ft and the plurality of previous pixel data of the $i^{th}$ block of the previous frame Ft−1 are combined, and a variance value σ(i) is correspondingly generated.

In step S1206, by regarding a target pixel data from the $i^{th}$ block of the frame Ft as a basis, a distribution curve G(i) is generated according to the variance value σ(i), and the pixel distribution h(i) is compared with the distribution curve G(i) to correspondingly generate a weighting value W(i).

In step S1208, a noise estimation value $\sigma_{avg}$ is outputted according to the weighting values W(1) to W(M) and the variance values σ(1) to σ(M) respectively corresponding to the blocks Ft(1) to Ft(M) of the frame Ft.

Therefore, with the noise estimation apparatus and method thereof for calculating a noise estimation value of a frame disclosed by the embodiments, the noise level of image contents can be effectively determined.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A noise estimation apparatus, for calculating a noise estimation value of a frame; the frame having an M number of overlapping or non-overlapping blocks, each of the blocks having a plurality of pixel data including a target pixel data, where M is a positive integer greater than 1; the noise estimation apparatus comprising:
   a distribution calculation unit, for calculating pixel numbers respectively corresponding to a plurality of pixel values to generate a pixel distribution according to the plurality of pixel data of an ith block of the frame and a plurality of previous pixel data of the ith block of a previous frame, wherein i is a positive integer between 1 and M;
   a variance calculation unit, for combining the pixel data of the ith block of the frame and the previous pixel data of the ith block of the previous frame, and correspondingly generating a variance value;
   a distribution curve generation module, for generating a distribution curve according to the variance value by regarding the target pixel data of the ith block of the frame as a basis, and comparing the pixel distribution with the curve distribution to correspondingly generate a weighting value; and a noise estimation unit, for outputting the noise estimation value according to the weighting value and the variance value corresponding to each of the blocks of the frame;

wherein at least one of the distribution calculation unit, the variance calculation unit, the distribution curve generation module and the noise estimation unit is implemented by a processor.

2. The noise estimation apparatus according to claim 1, wherein the distribution calculation unit comprises:

a first calculation unit, for calculating the pixel numbers of the pixel data of the ith block of the frame respectively corresponding to the pixel values to output a first distribution;

a second calculation unit, for calculating the pixel numbers of the previous pixel data of the ith block of the previous frame respectively corresponding to the pixel values to output a second distribution; and a combination unit, for combining the first distribution and the second distribution to generate the pixel distribution.

3. The noise estimation apparatus according to claim 1, wherein the variance calculation unit comprises:

a computation unit, for combining the pixel data of the ith block of the frame and the previous pixel data of the ith block of the previous frame to correspondingly output a synthesis pixel data; and a variance acquisition unit, for generating the variance value according to the synthesis pixel data.

4. The noise estimation apparatus according to claim 1, wherein the distribution curve generation module comprises:

a distribution curve generation unit, for looking up a lookup table (LUT) according to the variance value by regarding the target pixel data of the ith block of the frame as the basis to output the distribution curve;

a difference calculation unit, for comparing the distribution curve with the pixel distribution to output a difference; and a weighting calculation unit, for correspondingly generating the weighting value according to the difference.

5. The noise estimation apparatus according to claim 4, wherein the distribution curve is a Gaussian distribution.

6. The noise estimation apparatus according to claim 4, wherein when a value of the difference is between a first threshold and a second threshold greater than the first threshold, the corresponding weighting value gets smaller as the difference becomes larger.

7. The noise estimation apparatus according to claim 6, wherein the first threshold and the second threshold are generated according to the variance value by means of dynamic thresholds.

8. The noise estimation apparatus according to claim 1, wherein the noise estimation unit comprises:

a noise estimator, for performing a weighted averaging process on the weighting value and the variance value corresponding to each of the blocks of the frame to output the noise estimation value.

9. The noise estimation apparatus according to claim 8, wherein the noise estimation unit further comprises:

a protection unit, for dividing the noise estimation value outputted by the noise estimator by a denominator when a sum of the weighting values of all of the blocks is lower than a threshold, and outputting a corresponding quotient as the noise estimation value;

wherein, the denominator gets larger as the sum of the weighting values of all of the blocks becomes further lower than the threshold.

10. The noise estimation apparatus according to claim 1, wherein the frame has an M number of pixels each corresponding to one block, and the target pixel data is a central pixel data of the corresponding block.

11. A noise estimation method, for calculating a noise estimation value of a frame; the frame having an M number of overlapping or non-overlapping blocks, each of the blocks having a plurality of pixel data including a target pixel data, where M is a positive integer greater than 1; the noise estimation method comprising:

calculating pixel numbers respectively corresponding to a plurality of pixel values to generate a pixel distribution according to the plurality of pixel data of an ith block of the frame and a plurality of previous pixel data of the ith block of a previous frame, wherein i is a positive integer between 1 and M;

combining the pixel data of the ith block of the frame and the previous pixel data of the ith block of the previous frame, and correspondingly generating a variance value;

generating a distribution curve according to the variance value by regarding the target pixel data of the ith block of the frame as a basis, and comparing the pixel distribution with the curve distribution to correspondingly generate a weighting value; and outputting the noise estimation value according to the weighting value and the variance value corresponding to each of the blocks of the frame;

wherein at least one of the step of calculating the pixel numbers, the step of combining the pixel data, the step of generating the distribution curve and the step of outputting the noise estimation value is performed by a processor.

12. The noise estimation method according to claim 11, wherein the step of generating the pixel distribution comprises:

calculating the pixel numbers of the pixel data of the ith block of the frame respectively corresponding to the pixel values to output a first distribution;

calculating the pixel numbers of the previous pixel data of the ith block of the previous frame respectively corresponding to the pixel values to output a second distribution; and combining the first distribution and the second distribution to generate the pixel distribution.

13. The noise estimation method according to claim 11, wherein the step of generating the variance value comprises:

combining the pixel data of the ith block of the frame and the previous pixel data of the ith block of the previous frame to correspondingly output a synthesis pixel data; and generating the variance value according to the synthesis pixel data.

14. The noise estimation method according to claim 11, wherein the step of generating the weighting value comprises:

looking up a LUT according to the variance value by regarding the target pixel data of the ith block of the frame as the basis to output the distribution curve;

comparing the distribution curve with the pixel distribution to output a difference; and correspondingly generating the weighting value according to the difference.

15. The noise estimation method according to claim 14, wherein the distribution curve is a Gaussian distribution.

16. The noise estimation method according to claim 14, wherein when a value of the difference is between a first threshold and a second threshold greater than the first threshold, the weighting value gets smaller as the difference becomes larger.

17. The noise estimation method according to claim 16, wherein the first threshold and the second threshold are generated according to the variance value by means of dynamic thresholds.

18. The noise estimation method according to claim 11, wherein the step of outputting the noise estimation value comprises:
- performing a weighted averaging process on the weighting value and the variance value corresponding to each of the blocks of the frame to output the noise estimation value.

19. The noise estimation method according to claim 18, wherein the step of outputting the noise estimation value further comprises:
- dividing the noise estimation value outputted by the noise estimator by a denominator when a sum of the weighting values of all of the blocks is lower than a threshold, and outputting a corresponding quotient as the noise estimation value;
- wherein, the denominator gets larger as the sum of the weighting values of all of the blocks becomes further lower than the threshold.

20. The noise estimation method according to claim 11, wherein the frame has an M number of pixels each corresponding to one block, and the target pixel data is a central pixel data of the corresponding block.

* * * * *